United States Patent
Frandsen (10) Patent No.: US 12,360,779 B1
(45) Date of Patent: Jul. 15, 2025

(54) REPLICATING CONFIGURATION DATA ACROSS A MULTI-TENANT SYSTEM

(71) Applicant: Google LLC, Mountain View, CA (US)

(72) Inventor: Daniel Frandsen, East Palo Alto, CA (US)

(73) Assignee: Google LLC, Mountan View, CA (US)

( * ) Notice: Subject to any disclaimer, the term of this patent is extended or adjusted under 35 U.S.C. 154(b) by 82 days.

(21) Appl. No.: 18/336,870

(22) Filed: Jun. 16, 2023

(51) Int. Cl.
  *G06F 1/24* (2006.01)
  *G06F 9/445* (2018.01)
  *G06F 9/4401* (2018.01)

(52) U.S. Cl.
  CPC ........ *G06F 9/44505* (2013.01); *G06F 9/4411* (2013.01)

(58) Field of Classification Search
  CPC .................................... G06F 9/44505
  USPC ....................................... 713/100
  See application file for complete search history.

(56) References Cited

U.S. PATENT DOCUMENTS

| | | | |
|---|---|---|---|
| 9,262,494 B2 * | 2/2016 | Konersmann | H04L 67/1097 |
| 9,641,385 B1 * | 5/2017 | Daniel | H04L 41/0895 |
| 10,129,094 B1 * | 11/2018 | Seetharaman | H04L 41/0897 |
| 11,709,807 B2 * | 7/2023 | Proctor | G06F 16/211 |
| | | | 707/609 |
| 11,888,684 B1 * | 1/2024 | Sans | G06F 9/44505 |
| 2014/0244585 A1 * | 8/2014 | Sivasubramanian | G06F 16/21 |
| | | | 707/639 |
| 2016/0203174 A1 * | 7/2016 | Shahane | G06F 16/2228 |
| | | | 707/803 |
| 2019/0014120 A1 * | 1/2019 | Drabant | H04L 63/104 |
| 2019/0129729 A1 * | 5/2019 | Peterkofsky | G06F 9/5072 |
| 2019/0245745 A1 * | 8/2019 | Macatangay | H04L 41/0866 |
| 2019/0294724 A1 * | 9/2019 | Michelis | G06F 16/2282 |
| 2021/0117425 A1 * | 4/2021 | Rao | H04L 41/0806 |
| 2022/0335384 A1 * | 10/2022 | Sharma | G06F 16/2471 |
| 2023/0325170 A1 * | 10/2023 | Ma | G06F 8/71 |
| | | | 717/170 |
| 2024/0031229 A1 * | 1/2024 | Palavalli | H04L 41/5054 |
| 2024/0045935 A1 * | 2/2024 | Schenkelman | H04L 63/102 |
| 2024/0256575 A1 * | 8/2024 | Zhang | G06F 16/282 |
| 2024/0305622 A1 * | 9/2024 | Vijayan | H04L 63/0823 |

* cited by examiner

*Primary Examiner* — Volvick Derose
(74) *Attorney, Agent, or Firm* — Lowenstein Sandler LLP (57) ABSTRACT

A request to update first configuration data associated with a first tenant of a multi-tenant system is received. The first configuration data can be included in a first shard residing at a first node of the system. The first shard can also include second configuration data associated with a second tenant. Upon initiation of an operation to update the first configuration data at the first node in accordance with the first request, an anomaly associated with the update at the first node is detected. A request to access the second configuration data is received. A second node that includes a second shard that includes the second configuration data is identified. An operation is performed to provide the second tenant with access to the second configuration data at the second node before the anomaly associated with the update to the first configuration data is resolved.

20 Claims, 6 Drawing Sheets

```
┌─────────────────────────────────────────────────────────────────────────────┐
│ Determine that first configuration data associated with a first tenant of a │
│ multi-tenant system and second configuration data associated with a second  │
│ tenant of a multi-tenant system are to be stored at a memory associated     │
│ with a first shard at a first node 410                                      │
└─────────────────────────────────────────────────────────────────────────────┘
                                      │
                                      ▼
┌─────────────────────────────────────────────────────────────────────────────┐
│          Obtain the first configuration data associated with the first      │
│                                 tenant 412                                  │
└─────────────────────────────────────────────────────────────────────────────┘
                                      │
                                      ▼
┌─────────────────────────────────────────────────────────────────────────────┐
│         Obtain the second configuration data associated with the second     │
│                                 tenant 414                                  │
└─────────────────────────────────────────────────────────────────────────────┘
                                      │
                                      ▼
┌─────────────────────────────────────────────────────────────────────────────┐
│  Update a configuration file to include at least a portion of the first     │
│  configuration data and at least a portion of the second configuration      │
│  data 416                                                                   │
└─────────────────────────────────────────────────────────────────────────────┘
                                      │
                                      ▼
┌─────────────────────────────────────────────────────────────────────────────┐
│ Provide the configuration file to be stored at the memory associated with   │
│ the first shard at the first node 418                                       │
└─────────────────────────────────────────────────────────────────────────────┘
```

REPLICATING CONFIGURATION DATA ACROSS A MULTI-TENANT SYSTEM

TECHNICAL FIELD

Aspects and implementation of the present disclosure relate to replicating configuration data across a multi-tenant system.

BACKGROUND

Multi-tenancy is an architecture in which a single instance of a software application serves multiple users (also referred to as tenants). Each tenant can customize parts of the application according to its preferences. Such customization can be included or otherwise reflected in configuration data (also referred to as a "config") associated with the tenant. In a multi-tenant system, access to an application can be provided to the tenants via common resources (e.g., computing resources, etc.) while a logical separation of tenant data is maintained. It can be a challenge for service providers of a multi-tenant system to scale a multi-tenant system while maintaining performance and availability of the shared resources to each tenant.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for replicating configuration data across a multi-tenant system. In an implementation, a method includes receiving, by a configuration manager of a multi-tenant system, a first request to update first configuration data associated with a first tenant of the multi-tenant system. The first configuration data is included in a first shard residing at a first node of the multi-tenant system. The first shard also includes second configuration data associated with a second tenant of the multi-tenant system. The method further includes, upon initiating an operation to update the first configuration data at the first node in accordance with the first request, detecting, by the configuration manager, an anomaly associated with the update to the first configuration data at the first node. The method further includes receiving, by the configuration manager, a second request to access the second configuration data associated with the second tenant of the multi-tenant system. The method further includes identifying, by the configuration manager, a second node of the multi-tenant system that includes a second shard that includes the second configuration data associated with the second tenant. The method further includes performing an operation to provide the second tenant with access to the second configuration data at the second node before the detected anomaly associated with the update to the first configuration data at the first node is resolved.

In some additional or alternative implementations, the method further includes determining that the first configuration data associated with the first tenant and the second configuration data associated with the second tenant are to be stored at a region of memory associated with the first shard at the first node. The method further includes obtaining the first configuration data associated with the first tenant and the second configuration data associated with the second tenant. The method further includes updating a configuration file to include at least a portion of the first configuration data and at least a portion of the second configuration data. The method further includes providing the configuration file to be stored at the region of memory associated with the first shard at the first node.

In some additional or alternative implementations, determining that the first configuration data associated with the first tenant and the second configuration data associated with the second tenant are to be stored at the region of memory associated with the first shard at the first node includes providing, as input to a sharding function, one or more of: a first identifier associated with the first tenant, an indication of a number of shards of the multi-tenant system, or an indication of a number of shards that are to store replicated configuration data for each tenant of the multi-tenant system. The method further includes obtaining a first output of the sharding function, where the first output indicates a first set of shards of the multi-tenant system that are to store the first configuration data for the first tenant, the first set of shards comprising the first shard. The method further includes providing, as input to the sharding function, one or more of: a second identifier associated with the second tenant, the indication of the number of shards of the multi-tenant system, or the indication of the number of shards that are to store replicated configuration data for each tenant of the multi-tenant system. The method further includes obtaining a second output of the sharding function, where the second output indicates a second set of shards of the multi-tenant system that are to store the second configuration data for the second tenant, the second set of shards comprising the second shard.

In some additional or alternative implementations, determining that the first configuration data associated with the first tenant and the second configuration data associated with the second tenant are to be stored at the region of memory associated with the first shard at the first node includes providing one or more of the first configuration data or the second configuration data as input to a machine learning model, where the machine learning model is trained to predict, based on given input configuration data, a set of shards of the multi-tenant system that is to store the given input configuration data in view of at least one of a behavior or a performance of nodes of the multi-tenant system. The method further includes obtaining one or more outputs of the machine learning model. The method further includes extracting, from the one or more obtained outputs, at least one of a first set of shards that is to store the first configuration data or a second set of shards that is to store the second configuration data, where the at least one of the first set of shards or the second set of shards includes the first shard residing at the first node.

In some additional or alternative implementations, the anomaly associated with the update to the first configuration data at the first node is detected responsive to executing the configuration file stored at the memory associated with the first node.

In some additional or alternative implementations, the second request to access the second configuration data is received prior to detecting the anomaly associated with the update to the first configuration data at the first node.

In some additional or alternative implementations, the method further includes receiving a third request to erase the first configuration data from a memory associated with the first shard residing at the first node. The method further includes updating a first flag associated with the first configuration data to indicate that the first configuration data is to be erased from the memory. The method further includes responsive to detecting an update to a second flag associated with the second configuration data to indicate that the second configuration data is to be erased from the memory, erasing the first configuration data and the second configuration data from the memory.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to specific aspects or implementations, but are for explanation and understanding only.

DETAILED DESCRIPTION OF THE DRAWINGS

Aspects of the present disclosure generally relate to replicating configuration data across a multi-tenant system. A multi-tenant system refers to an architecture that allows multiple users (referred to as tenants) to utilize shared infrastructure and resources (e.g., computing resources) while maintaining a logical separation of tenant data. In some instances, a platform (or other such entity) can provide tenants with access to an instance of an application running via a multi-tenant system. Such application is referred to as a multi-tenant application. Tenants can each access the multi-tenant application using shared system resources, although data associated with each tenant may not be accessible to other tenants of the multi-tenant system.

A configuration refers to settings or constraints for a tenant's use of a multi-tenant system. Configurations can be defined based on preferences or requirements of one or more tenants in multi-tenant environment. In some instances, configurations can include parameters or settings related to user preferences, access controls, data storage options, custom workflows, integration settings, and so forth. Computing resources of a multi-tenant system can use configuration files, which may include configuration data for one or more tenants, to provide tenants with access to their configuration data and/or provide the tenant with access to an application instance in accordance with the settings or constraints defined by their configuration data. Conventionally, tenants of a multi-tenant system have shared the same configurations (or one of a few configurations) on a multi-tenant system. As tenant's applications become increasingly complex and sophisticated, tenants (or users of client devices associated with tenants) are requesting custom configurations to handle custom features or settings to meet their preferences. As the number of custom configurations increase, it can be difficult to manage each custom configuration on the limited resources of a multi-tenant system while also providing consistent access to the resources by each tenant to their respective configurations as well as isolation from other tenant's configurations.

Sharding refers to a technique of partitioning data and/or instructions of a multi-tenant application into multiple subsets, referred to as shards, and distributing the subsets across multiple groups of resources (e.g., computing resources, memory resources), referred to as nodes. A configuration manager can allocate a shard to one or more tenants of the multi-tenant system, where data of each shard is accessed and/or processed by computing resources of a node so as to provide the one or more tenants with access to an application instance. To address the above described issues regarding custom configurations, some configuration managers of conventional multi-tenant systems may allocate a shard to each tenant, where each tenant has its own configuration that is executed or otherwise maintained by the resources of a node that includes the allocated shard. However, as the number of tenants of a system increases, the number of configurations, and therefore the number of shards, also increases. A system with a large number of tenants (e.g., ten thousand or more) may not have the processing capacity and/or memory capacity to support a large number of shards, and therefore each tenant's custom configuration may not be effectively and safely supported on the system's fixed number of resources.

Aspects and implementations of the present disclosure address the above and other deficiencies by replicating configuration data across a multi-tenant system. According to embodiments of the present disclosure, a fixed number of shards can be provisioned on nodes (e.g., collections of computing resources) of a multi-tenant system. The number of shards provisioned on the nodes can be defined by an operator or engineer of the multi-tenant system, in some embodiments. Computing resources of a node can access and/or process data of each shard residing at the node, which can include configuration data for one or more tenants. A configuration manager can replicate and/or include configuration data for each tenant in multiple shards of the system. In an illustrative example, a first shard residing at a first node of a multi-tenant system can include first configuration data associated with a first tenant and second configuration data associated with a second tenant. In some instances, the first configuration data and the second configuration data can be included in a configuration file that is stored at the first node and accessed and/or executed by the first shard, in some embodiments. The configuration manager can replicate and include the first configuration data at a second shard residing at a second node that also includes third configuration data associated with a third tenant (e.g., in a configuration file stored at the second node). Similarly, the second configuration data associated with the second tenant can be replicated and included at a third shard residing at a third node that also includes fourth configuration data associated with a fourth tenant (e.g., in a configuration file stored at the third node).

In some embodiments, a configuration manager of the multi-tenant system can receive a request to update the first configuration data associated with the first tenant. The configuration manager can initiate one or more operations to update the first configuration data at each node that hosts a shard including the first configuration data (e.g., the first node and/or the second node). The configuration manager can receive another request to access the second configuration data associated with the second tenant. Prior to or responsive to receiving the request to access the second configuration data, the configuration manager can detect an anomaly (e.g., an error, delay due to a connectivity issue, etc.) associated with the update to the first configuration data at the first node. The configuration manager can identify another node (e.g., the third node) that hosts the second shard including the second configuration data. The configuration manager can perform an operation to provide the second tenant with access to the second configuration data at the second node before the anomaly associated with the first configuration data at the first node is resolved (e.g., the error is corrected, the update is completed, etc.). Accordingly, the anomaly associated with the update to the first configuration data at the first node does not impact the second tenant's access to the second configuration data.

Aspects of the present disclosure address the above mentioned deficiencies by providing techniques that enable replication of configuration data for tenants of a multi-tenant system while ensuring consistent access of tenant's configuration data if an anomaly occurs during an update at a shard of the system. As described above, when a request is received to update configuration data for a particular tenant, the configuration manager updates the configuration data at each shard allocated to include the configuration data. Accordingly, updated configuration data for each tenant is available at each shard of the multi-tenant system. In some instances, a requested update can be delayed or cause an error to the configuration data, which can prevent shards including the configuration data from accessing other configuration data and/or executing configuration files that include the configuration data being updated and the other configuration data. If another tenant requests access to the other configuration data before the anomaly is resolved, the configuration manager can identify another shard (e.g., residing at another node) that includes the other configuration data of the requesting tenant and can provide the requesting tenant with access to the other configuration data via the other shard. Accordingly, techniques of the present embodiment enable tenants to have custom configuration data that is accessible to the tenants during a runtime of the multi-tenant application while minimizing the number of shards partitioned in the multi-tenant system. Consistent access to configuration data (e.g., even when an anomaly occurs during an update to other configuration data of another tenant) can improve an overall availability and performance of the multi-tenant system, which can increase an overall efficiency and decrease an overall latency of the system.

Figure 1:
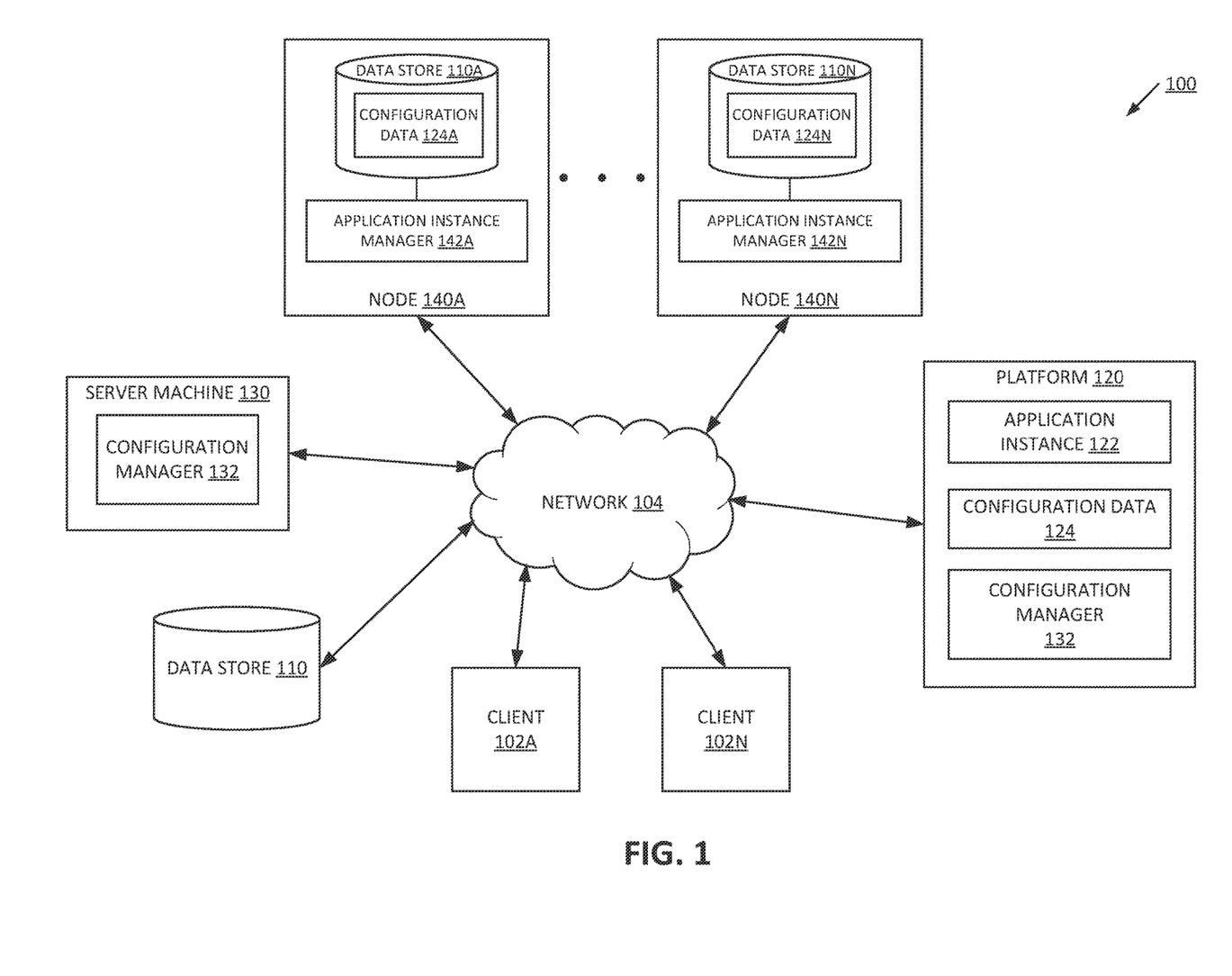
FIG. 1 illustrates an example system architecture, in accordance with implementations of the present disclosure.

FIG. 1 illustrates an example system architecture 100, in accordance with implementations of the present disclosure. The system architecture 100 (also referred to as "system" herein) includes client devices 102A-N, a data store 110, a platform 120 (e.g., a multi-tenant application platform), and/or one or more server machines 130, each connected to a network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some embodiments, system 100 can include one or more components or entities of a multi-tenant system.

The client devices 102A-N (collectively and individually referred to as client device(s) 102 herein) may each include computing devices such as personal computers (PCs), laptops, mobile phones, smart phones, tablet computers, netbook computers, network-connected televisions, etc. In some implementations, client devices 102A-N may also be referred to as "user devices." Each client device may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital images, electronic books, etc.).

In some embodiments, one or more client devices 102 can be associated with a tenant of a multi-tenant system. A tenant refers to a user of the multi-tenant system. Platform 120 can provide multiple tenants of the multi-tenant system with access to an instance of a multi-tenant application (e.g., application instance 122). In an illustrative example, a multi-tenant application can include an electronic document application that enables users to access and/or edit electronic documents (e.g., via a UI of a client device 102). Platform 120 can provide client devices 102 associated with a particular tenant with access to an electronic document via application instances 122. Platform 120 can store the electronic document (or portions of the electronic document) at data store 110, in some embodiments. The electronic document(s) associated with the tenant can be provided in isolation from other electronic document(s) associated with other tenants of system 100. It should be noted that platform 120 can provide tenants with access to any type of multi-tenant application, in accordance with embodiments of the present disclosure.

A tenant's access to application instance 122 can be defined by configuration data 124. Configuration data 124 (also referred to as configuration 124 herein) refers to settings or constraints for a tenant's use of application instance 122. Configuration data 124 can be provided to platform 120 by a tenant (e.g., via one or more client devices 102 associated with the tenant) or by another entity of system 100 (e.g., a developer or operator of system 100, etc.). In additional or alternative embodiments, configuration data 124 can be determined or updated based on a behavior or performance of application instance 122 running on client device 102. Configuration data 124 can include, in some embodiments, parameters or settings related to tenant preferences, access controls, data storage options, custom workflows, integration settings, and so forth.

As illustrated in FIG. 1, platform 120 can include a configuration manager 132 that is configured to manage configuration data 124 for each tenant of system 100. In some embodiments, configuration manager 132 allocate one or more shards of system 100 to a particular tenant and can replicate configuration data 124 for inclusion at each allocated shard. Sharding refers to a technique of partitioning data and/or instructions of a multi-tenant application into multiple subsets (referred to as shards) and distributing the shards across multiple groups of resources. In some embodiments, configuration manager 132 can partition data and/or instructions of a multi-tenant application in to multiple shards that are distributed across one or more nodes 140 of system 100. A node refers to a collection of resources, such as memory resources and/or computing resources, that are used to execute at least a portion of the multi-tenant application. In some embodiments, a node 140 can include one or more server machines that are dedicated to providing one or more tenants with access to application instance 122. Configuration manager 132 can partition data of the multi-tenant application into shards and can provide data of each shard to a node 140 for storage at a region of memory (e.g., of data store 110, of another data store) that is allocated for the node 140. One or more processing units of node 140 can access the data of the shard to provide one or more tenants with access to application instance 122, in accordance with embodiments described herein.

In an illustrative example, system 100 can include at least node 140A and 140N. Configuration manager 132 can partition data of the multi-tenant application (e.g., according to multi-tenant application partitioning techniques) to create one or more shards and can distribute the shards to node 140A and node 140N (e.g., for storage at data store 110A and data store 110N). For example, data for a first shard can be stored at data store 110A of node 140A and data for a second shard can be stored at data store 110N of node 140N. In some embodiments, configuration manager 132 (or another component of platform 120) can allocate a particular shard (or group of shards) to a particular tenant of system 100. For example, configuration manger 132 can allocate the first shard at node 140A to a first tenant and the second shard at node 140N to a second tenant. Application instance manager 142A running at node 140A can access the data for the first shard at data store 110A to provide the first tenant with access to application instance 122 (e.g., using computing resources of node 140A), in some embodiments. Application instance manager 142N running at node 140N can access the data for the second shard at data store 110N to provide the second tenant with access to application instance 122 (e.g., using computing resources of node 140N), in additional or alternative embodiments.

In some embodiments, the data of shards distributed across nodes 140 of system 100 can include configuration data 124. For example, data of the first shard at node 140A can include configuration data 124A associated with the first tenant and data of the second shard at node 140N can include configuration data 124N associated with the second tenant. In some embodiments, configuration manager 132 can replicate configuration data 124 associated with each tenant and can distribute the replicated configuration data 124 to multiple shards of system 100, in accordance with embodiments described herein. According to embodiments of the present disclosure, each shard can include configuration data 124 associated with one or more tenants (e.g., in a configuration file stored at data store 110A). Configuration data 124 associated with each tenant can be replicated and included at multiple shards across the system 100. If an update to configuration data 124 of a particular tenant causes an error or a delay at a node that includes an allocated shard, configuration manager 132 can identify another shard (e.g., running at another node 140) that includes the replicated configuration data 124 and can provide a tenant with access to the replicated configuration data 124 (e.g., before the error to the updated configuration data 124 is resolved). Further details regarding replicating the configuration data 124 across shards of a multi-tenant system and providing tenants with access to the configuration data 124 are provided herein.

It should be noted that although FIG. 1 depicts configuration manager 132 as part of platform 120, configuration manager 132 can reside at any component of system 100. For example, configuration manager 132 can reside at a server machine 130 that is accessible to platform 120 (e.g., via network 104). In another example, configuration manager 132 can reside at one or more nodes 140 of system 100.

In some implementations, platform 120, server machine 130, and/or nodes 140 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. In some implementations, the functions of platform 120 and/or server machines 130-150 may be provided by a more than one machine. For example, in some implementations, the functions of configuration manager 132 and/or application instance manager 142 may be provided by two or more separate server machines. Platform 120 server machine 130, and/or nodes 140 may also include a website (e.g., a webpage) or application back-end software that may be used to enable a user to access media items, as described herein.

In general, functions described in implementations as being performed by platform 120 can also be performed on the client devices 102 in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in websites.

It should be noted that although some embodiments of the present disclosure are directed to a content sharing platform, embodiments of this disclosure can be applied to other types of platforms. For example, embodiments of the present disclosure can be applied to a content archive platform, a content storage platform, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the platform 120.

In situations in which the systems discussed here collect personal information about users, or can make use of personal information, the users can be provided with an opportunity to control whether platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 120.

Figure 2:
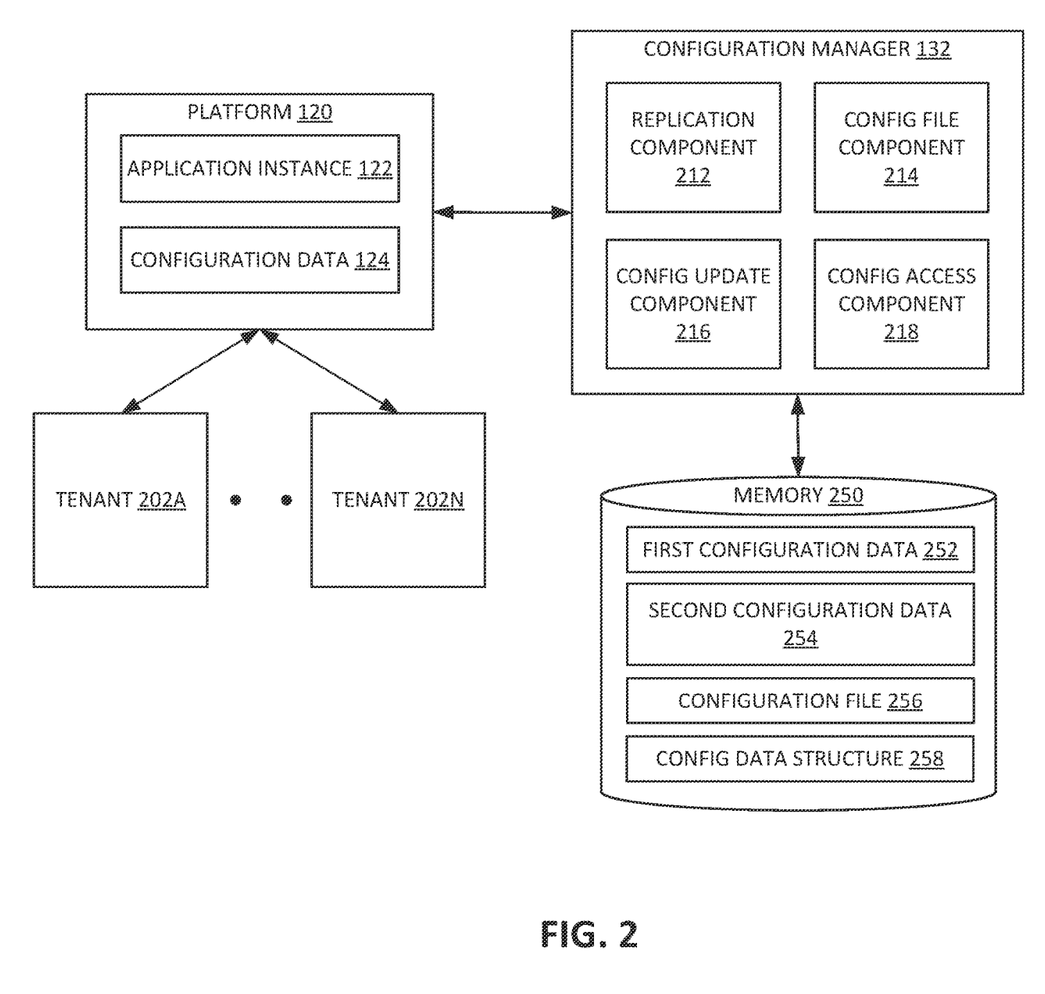
FIG. 2 is a block diagram illustrating a platform and a configuration manager for the platform, in accordance with an implementation of the disclosure.

FIG. 2 is a block diagram illustrating a platform 120 and a configuration manager 132 for the platform, in accordance with an implementation of the disclosure. As described above, platform 120 can provide tenants 202 (or client devices 102 associated with a tenant 202) with access to an application instance 122. Access to an application instance 122 can be defined based on configuration data 124 associated with a respective tenant 202. In some embodiments, configuration data 124 can be the same or similar for two or more tenants 202. In other or similar embodiments, configuration data 124 for each tenant 202 can be unique from configuration data 124 associated with other tenants 202 of system 100. In some embodiments, a tenant 202 can provide platform 120 with configuration data 124 (e.g., via network 104). In other or similar embodiments, another entity of or connected to system 100 can provide platform with configuration data 124 associated with a tenant 202. In yet other or similar embodiments, configuration manager 132 (or another entity of platform 120) can generate or update configuration data 124 for a tenant 202 (e.g., based on a behavior and/or performance of application instance 122).

Configuration manager 132 can be configured to manage configuration data 124 for each tenant 202 of system 100. As illustrated in FIG. 2, configuration manager 132 includes a replication component 212, a configuration (config) file component 214, a config update component 216, and/or a config access component 218. Platform 120 and/or configuration manager 132 can access memory 250. Memory 250 can correspond to any portion of data store 110 (or any portion of data store 110A-110N residing at nodes 140), in some embodiments. Memory 250 can correspond to any memory of or connected to system 100, in additional or alternative embodiments.

In some embodiments, platform 120 can obtain configuration data 124 associated with each tenant 202 of system 100, as described above. Replication component 212 can replicate configuration data 124 for each tenant and can distribute the replicated configuration data 124 across multiple shards (e.g., residing at nodes) of system 100. In some embodiments, replication component 212 can determine which tenant's configuration data 124 is to be included at which shard of system 100 based on one or more outputs of a sharding function. A sharding function can accept, as an input, an identifier associated with a particular tenant 202, a number of shards that are partitioned at the system, and/or a replication dimension (e.g., a number of shards that are to store replicated configuration data for each tenant of system 100). The number of shards partitioned at the system 100 can be provided to replication component 212 by an operator or engineer of system 100, in some embodiments. In other or similar embodiments, configuration manger 132 (or another component of system 100) can determine a number of partitioned shards of system 100 (e.g., during an initialization period) and can store the determined number at a memory of system 100 (e.g., at memory 250). The replication dimension can be provided to replication component 212 by an operator or engineer of system 100, in some embodiments. In additional or alternative embodiments, replication component 212 (or another component of configuration manager 132) can determine the value of the replication dimension based on historical or experimental data associated with system 100. The sharding function can provide, as an output, a set of shards that are to store the replicated configuration data for a respective tenant 202 of system 100. Replication component 212 can determine the shards that are to include a tenant's configuration data 124 based on one or more outputs of the sharding function.

In an illustrative example, the number of shards that are partitioned at system 100 can be 100 and a replication dimension can have a value of 3. Replication component 212 can provide an identifier associated with tenant 202A (e.g., "$t_0$"), the number of partitioned shards, and the replication dimension as input to the sharding function and can obtain an output of the sharding function. The output of the sharding function can indicate that first configuration data 252 for tenant 202A can be stored in a set of shards having identifiers of "57, 3, 85." If replication component 212 instead provides an identifier associated with a tenant 202B (e.g., "t1") as input to the sharding function, the output of the sharding function can indicate that second configuration data 254 for tenant 202B can be stored at a set of shards having identifiers of "83, 3, 90." In accordance with this illustrative example, the set of shards determined for tenant 202A and for tenant 202B both include shard "3." Accordingly, replication component 212 can determine that shard "3" is to store both the first configuration data 252 associated with tenant 202A and the second configuration data 254 associated with tenant 202B. Based on the output(s) of the sharding function, replication component 212 can also determine that shards "57" and "85" are both to include first configuration data 252 (e.g., with configuration data 124 associated with other tenants 202 of system 100). Replication component 214 can additionally determine that shards "83" and "90" are to include second configuration data 254 (e.g., with configuration data 124 associated with other tenants 202 of system 100).

In some embodiments, replication component 212 can determine which tenant's configuration data 124 is to be included at which shard of system 100 based on one or more outputs of a trained machine learning model. In some embodiments, a machine learning model can be trained to predict, based on given input configuration data, a set of shards of a multi-tenant system that is to store the given input configuration data in view of a behavior and/or a performance of nodes of the multi-tenant system. The machine learning model can be trained based on historical configuration data for prior tenants of system 100, historical replication data (e.g., shards that included replicated configuration data) of system 100, and/or historical behavior and/or performance data of system 100. In response to providing the configuration data 124 for a tenant 202 as input to the trained machine learning model, replication component 212 can obtain one or more outputs of the model. The one or more outputs can include one or more sets of shards and, for each set of shards, a level of confidence that a respective set of shards will satisfy one or more behavior criteria and/or performance criteria associated with system 100. Replication component 212 can extract a set of shards that is to store configuration data 124 for a tenant 202 from the outputs of the model (e.g., by identifying the set of shards that satisfy the behavior criteria and/or the performance criteria).

It should be noted that replication component 212 can determine shards that are to store replicated configuration data 124 according to other techniques, in some embodiments. In some embodiments, the sets of shards that are determined for storing configuration data 124 for a particular tenant 202 may not include any duplicate shards. In additional or alternative embodiments, each shard partitioned at system 100 may be evenly distributed across each set of shards (e.g., each shard will include configuration data 124 for the same number of tenants).

Figure 3:
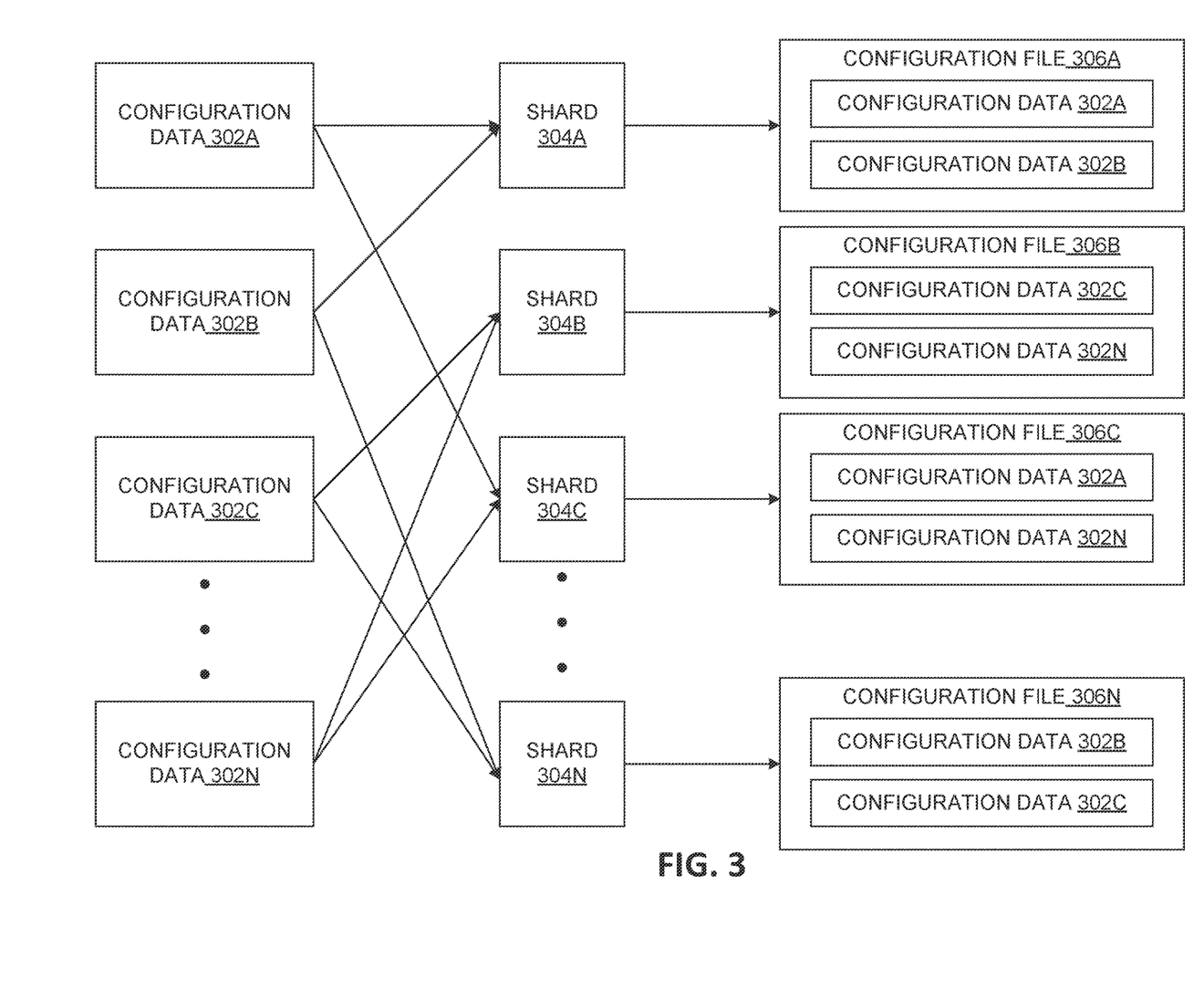
FIG. 3 illustrates an example of replicating data across a multi-tenant system, in accordance with an implementation of the disclosure.

FIG. 3 illustrates an example of replicating data across a multi-tenant system, in accordance with an implementation of the disclosure. Configuration data 302, as illustrated in FIG. 3, can be associated with one or more tenants 202 of system 100. For example, configuration data 302A can be associated with tenant 202A, configuration data 302B can be associated with tenant 202B, configuration data 302C can be associated with tenant 202C, and/or configuration data 302N can be associated with tenant 202N. Replication component 212 can determine a shard that is to include configuration data 302 for a particular tenant 202, according to previously described embodiments. In an illustrative example, replication component 212 can determine (e.g., based on an output of the sharding function or the machine learning model) that configuration data 302A associated with tenant 202A is to be included at shard 304A and shard 304C. Replication component 212 can also determine that configuration data 302B associated with tenant 202B is to be included at shard 304A and shard 304N, configuration data 302C associated with tenant 202C is to be included at shard 304B and shard 304N, and configuration data 302N associated with tenant 202N is to be included at shard 304B and shard 304C.

Referring back to FIG. 2, config file component 214 can be configured to generate and/or update a configuration file 256 to include configuration data 124 for tenants allocated to a particular shard. In accordance with a previous illustrative example, config file component 214 can generate and/or update a configuration file 256 for the shard having the identifier of "3" to include the first configuration data 252 and the second configuration data 254. Upon or responsive to generating and/or updating a configuration file 256, config file component 256 can provide (e.g., via network 104) the configuration file 256 to node including a shard that is allocated to include the configuration data of the configuration file 256. The configuration file 265, when executed by computing resources of a node that includes the shard having the identifier of "3," can provide tenant 202A with access to the first configuration data 252 and/or tenant 202B with access to the second configuration data 254.

In accordance with examples illustrated in FIG. 3, config file component 214 can generate and/or update a configuration file 306A to include configuration data 302A and configuration data 302B, as described above. Config file component 214 can also generate and/or update a configuration file 306B to include configuration data 302C and configuration data 302N, configuration file 306C to include configuration data 302A and configuration data 302N, and configuration file 306N to include configuration data 302B and configuration data 302C.

In some embodiments, replication component 212 and/or config file component 214 can update a config data structure 258 to indicate which shards of system 100 include replicated configuration data 124 for each tenant 202. Each entry of config data structure 258 can include, in some embodiments, an identifier for a respective tenant 202 of system 100 and an identifier of one or more shards that includes replicated configuration data 124 associated with the tenant 202. The identifier of the one or more shards can include an indication of a particular shard that stores the configuration data 124 (e.g., shard "3," etc.) and/or a memory address of a memory at a node 140 that includes the shard. In additional or alternative embodiments, the entry can include an indication of a node 140 that includes the shard.

In some embodiments, configuration manager 132 can receive a request to update configuration data 124 associated with a particular tenant 202 of system 100. The request can be received from tenant 202, in some embodiments. In additional or alternative embodiments, the request can be received from another entity of system 100 and/or from a client device 102 associated with an operator or engineer of system 100. Config update component 216 can identify one or more shards that include the configuration data 124 associated with the tenant 202 by identifying an entry of config data structure 258 that corresponds to the tenant 202 and extracting a set of shards that includes the configuration data 124 from the identified entry. In response to identifying the one or more shards, config update component 216 can transmit one or more instructions (e.g., via network 104) to respective nodes that include the one or more shards. The instructions can cause computing resources at the respective nodes to update the configuration data 124 in accordance with the request.

In some embodiments, an anomaly can occur during or after an update to configuration data 124. For example, computing resources at a node may not be able to successfully execute the instructions to update the configuration data 124. In another example, computing resources may update the configuration data 124, however, an error can occur when the configuration file 256 that includes the configuration data 124 is executed. In an illustrative example, config update component 216 can update a configuration file 256 including first configuration data 252 and second configuration data 254 in response to a request. An anomaly may occur at a node that includes a shard associated with the configuration file 256. Accordingly, computing resources of the node may not execute the configuration file 256 that includes the first configuration data 252 and the second configuration data 254 until the anomaly is resolved.

In some embodiments, config access component 218 can receive a request to access configuration data 124 that resides at a node where an anomaly occurred during or after an update to configuration data 124. For example, config access component 218 can receive a request to access second configuration data 254 at a node 140 that includes the configuration file 256 that is subject to the anomaly based on the update to the first configuration data 254. Accordingly, config access component 218 may not be able to provide tenant 202B (e.g., associated with second configuration data 254) with access to the second configuration data 254 of configuration file 256 at the node 140 when the request is received. In some embodiments, config access component 218 can identify another shard of system 100 that includes second configuration data 254. For example, config access component 218 can identify an entry of config data structure 258 that corresponds to tenant 202B and can extract, from the identified entry, a set of shards that includes second configuration data 254. Config access component 218 can determine another shard that includes the second configuration data 254 and can perform one or more operations to enable the second tenant 202 to access the second configuration data 254 at the node including the other shard. In some embodiments, the one or more operations can include an operation to route the request to the node that includes the other shard. Computing resources of the node can execute the configuration file 256 that includes the second configuration data 254, as described above.

Figure 4:
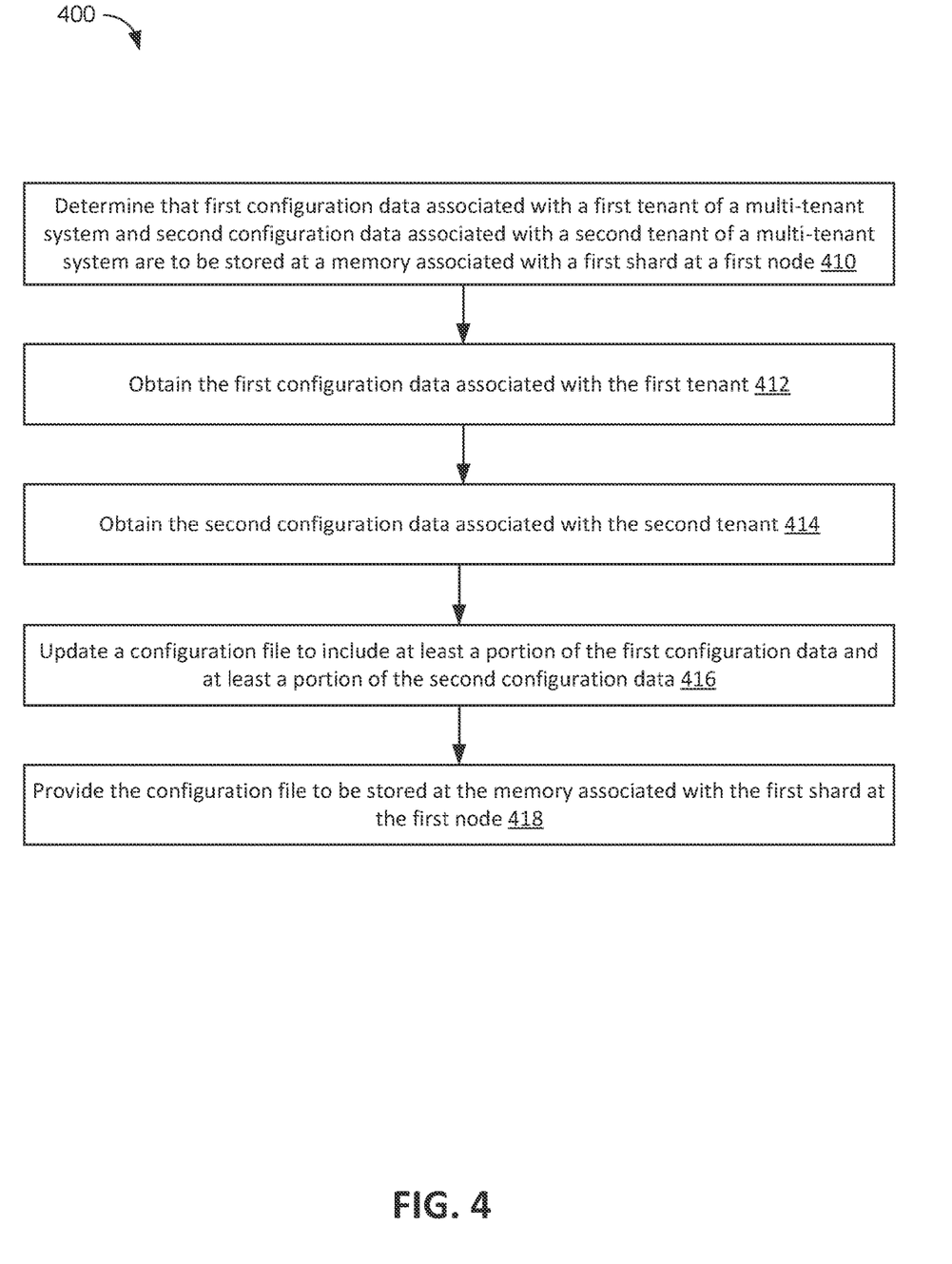
FIG. 4 is a flow diagram illustrating an example method of replicating configuration data across a multi-tenant system, in accordance with an implementation of the disclosure.

FIG. 4 is a flow diagram illustrating an example method 400 of replicating configuration data across a multi-tenant system, in accordance with an implementation of the disclosure. Method 400 may be performed by processing logic that may include hardware (circuitry, dedicated logic, etc.), software (e.g., instructions run on a processing device), or a combination thereof. In one implementation, some or all the operations of method 400 may be performed by one or more components of system 100 of FIG. 1 and/or one or more components of FIG. 2. For example, one or more operations of method 400 can be performed by configuration manager 132, in some embodiments.

At block 410, processing logic determines that first configuration data associated with a first tenant of a multi-tenant system and second configuration data associated with a second tenant of a multi-tenant system are to be stored at a memory associated with a first shard. In some embodiments, processing logic can determine that the first configuration data and the second configuration data are to be stored at the memory associated with the first shard at the first node based on outputs of a sharding function, as described above. In other or similar embodiments, processing logic can determine that the first configuration data and the second configuration data are to be stored at the memory associated with the first shard at the first node based on an output of a trained machine learning model, as described above.

At block 412, processing logic obtains the first configuration data associated with the first tenant. At block 414, processing logic obtains the second configuration data associated with the second tenant. At block 416, processing logic updates a configuration file to include at least a portion of the first configuration data and at least a portion of the second configuration data. At block 418, processing logic provides the configuration file to be stored at the memory associated with the first shard at the first node.

Figure 5:
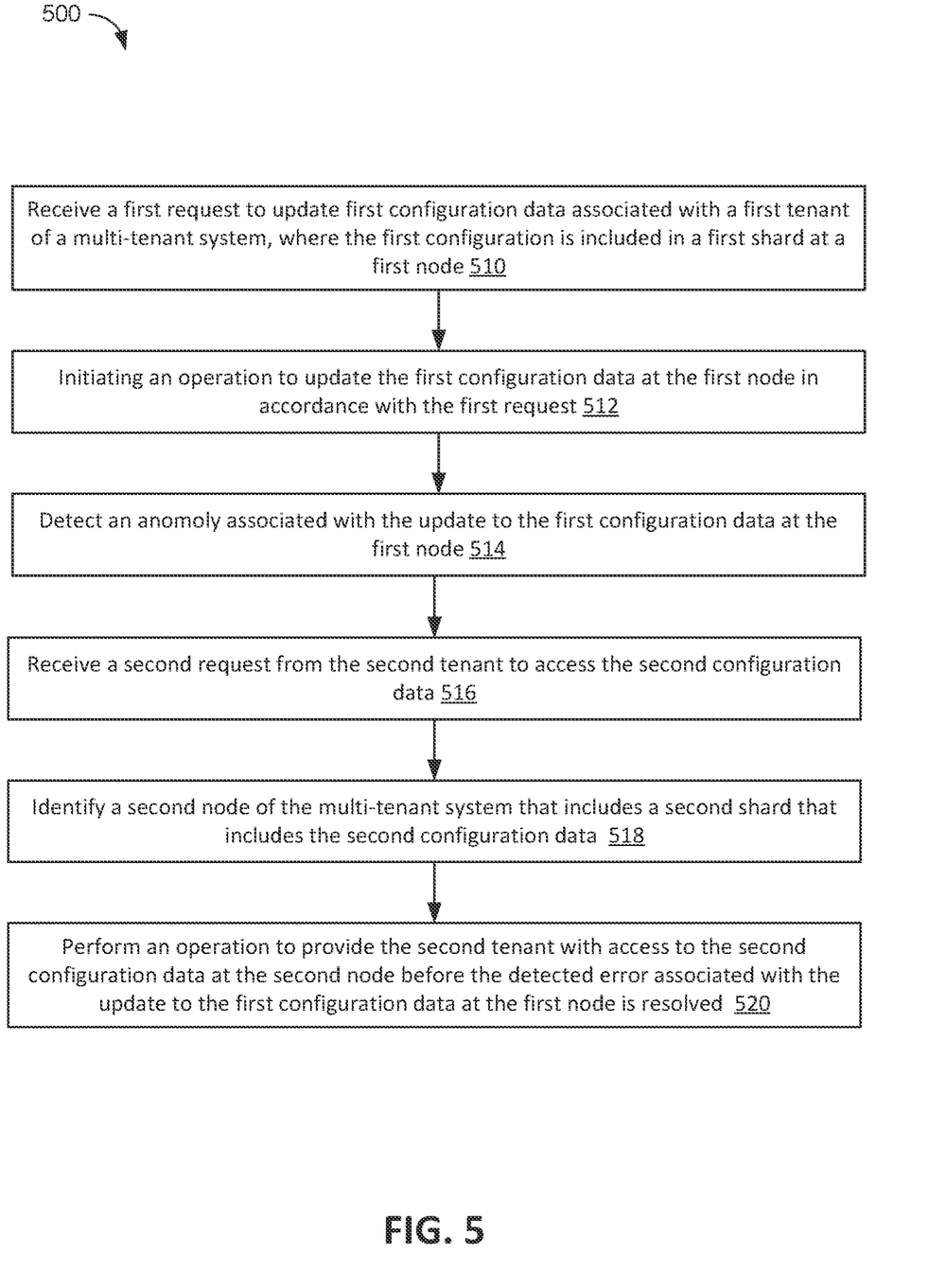
FIG. 5 is a flow diagram illustrating an example method of performing an operation to access configuration data replicated at a multi-tenant system, in accordance with an implementation of the disclosure.

FIG. 5 is a flow diagram illustrating an example method 500 of performing an operation to access configuration data replicated at a multi-tenant system, in accordance with an implementation of the disclosure. Method 500 may be performed by processing logic that may include hardware (circuitry, dedicated logic, etc.), software (e.g., instructions run on a processing device), or a combination thereof. In one implementation, some or all the operations of method 500 may be performed by one or more components of system 100 of FIG. 1 and/or one or more components of FIG. 2. For example, one or more operations of method 500 can be performed by configuration manager 132, in some embodiments.

At block 510, processing logic receives a first request to update first configuration data associated with a first tenant of a multi-tenant system. The first request can be received from the first tenant or another entity (of or connected to the multi-tenant system). The first configuration data is included in a first shard at a first node. The first shard also includes second configuration data associated with a second tenant of the multi-tenant system.

At block 512, processing logic initiates an operation to update the first configuration data at the first node in accordance with the first request. At block 514, processing logic detects an anomaly associated with the update to the first configuration data at the first node. In some embodiments, the anomaly can be detected responsive to executing the configuration file stored at the memory associated with the first node.

At block 516, processing logic receives a second request from the second tenant to access the second configuration data. In some embodiments, the second request to access the second configuration data can be received prior to detecting the anomaly associated with the update to the first configuration data at the first node. At block 518, processing logic identifies a second node of the multi-tenant system that includes a second shard that includes the second configuration data. At block 520, processing logic performs an operation to provide the second tenant with access to the second configuration data at the second node before the detected anomaly associated with the update to the first configuration data at the first node is resolved. The operation to provide the second tenant with access to the second configuration data can be an operation to execute a configuration file at the second node that includes the second configuration data.

In some embodiments, processing logic can receive a third request to erase the first configuration data from a memory associated with the first shard residing at the first node. Processing logic can update a first flag associated with the first configuration data to indicate that the first configuration data is to be erased from the memory. In response to detecting an update to a second flag associated with the second configuration data to indicate that the second configuration data is to be erased from the memory, processing logic can erase the first configuration data and the second configuration data from the memory.

Figure 6:
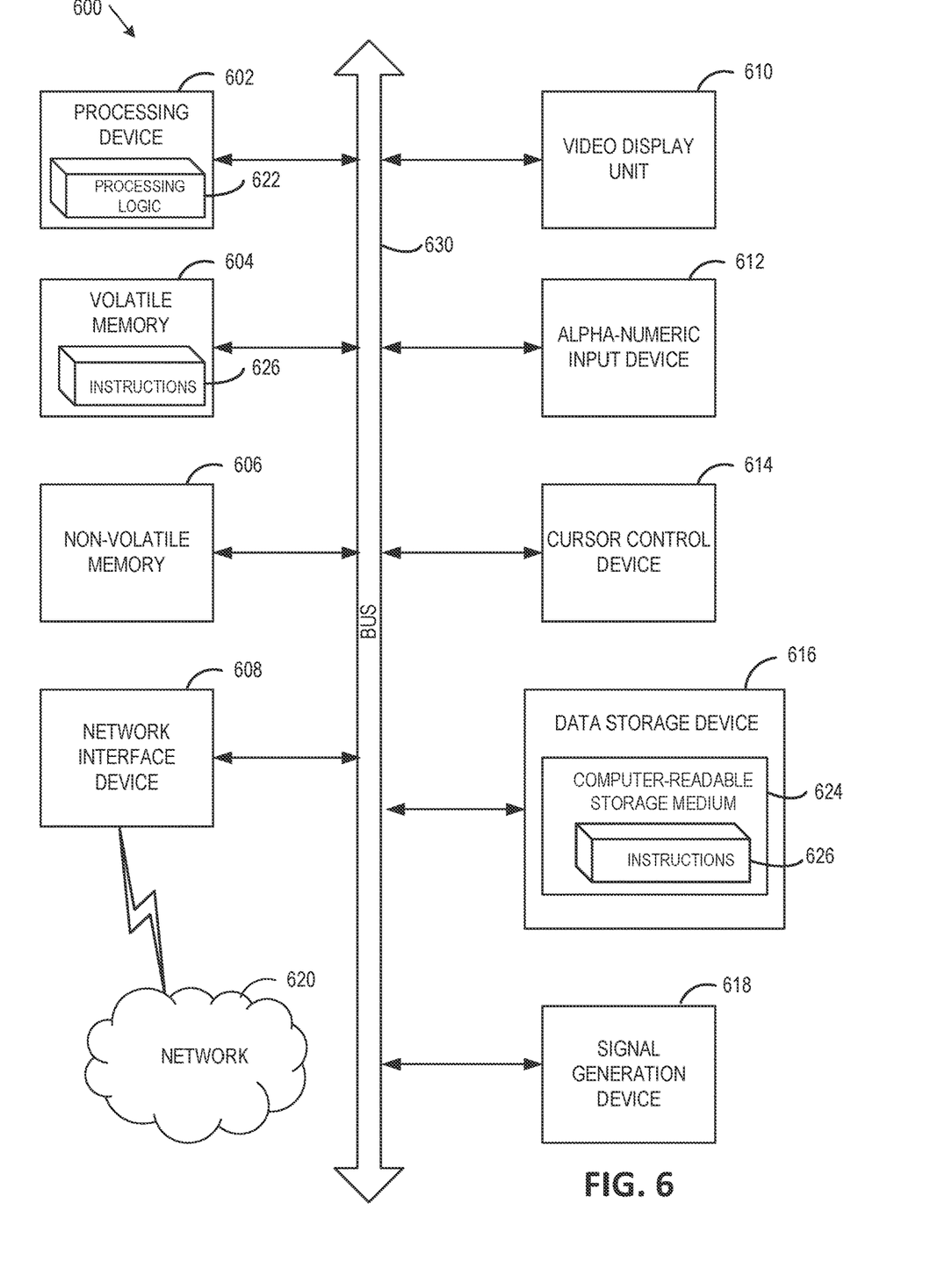
FIG. 6 is a block diagram illustrating one implementation of a computer system, in accordance with an implementation of the disclosure.

FIG. 6 is a block diagram illustrating an exemplary computer system, in accordance with implementations of the present disclosure. The computer system 600 can be the server machine 160 or client devices 130A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
storing, by a configuration manager of a multi-tenant system and based on an output of at least one of a sharding function or a machine learning model, configuration data of a first shard at a first node of the multi-tenant system, wherein the configuration data of the first shard comprises first configuration data associated with a first tenant of the multi-tenant system and second configuration data associated with a second tenant of the multi-tenant system;
receiving, by a configuration manager, a first request to update the first configuration data;
receiving, by the configuration manager, a second request to access the second configuration data associated with the second tenant of the multi-tenant system;
identifying, by the configuration manager, a second node of the multi-tenant system that comprises a second shard that includes the second configuration data associated with the second tenant; and
performing, by the configuration manager, an operation to provide the second tenant with access to the second configuration data at the second node before the detected anomaly associated with the update to the first configuration data at the first node is resolved.

2. The method of claim 1, further comprising:
obtaining the first configuration data associated with the first tenant and the second configuration data associated with the second tenant;
updating a configuration file to include at least a portion of the first configuration data and at least a portion of the second configuration data; and
providing the configuration file to be stored at a region of memory associated with the first shard at the first node.

3. The method of claim 2, wherein the anomaly associated with the update to the first configuration data at the first node is detected responsive to executing the configuration file stored at the memory associated with the first node.

4. The method of claim 1, further comprising:
providing, as input to the sharding function, one or more of: a first identifier associated with the first tenant, an indication of a number of shards of the multi-tenant system, or an indication of a number of shards that are to store replicated configuration data for each tenant of the multi-tenant system;
obtaining a first output of the sharding function, wherein the first output indicates a first set of shards of the multi-tenant system that are to store the first configuration data for the first tenant, the first set of shards comprising the first shard;
providing, as input to the sharding function, one or more of: a second identifier associated with the second tenant, the indication of the number of shards of the multi-tenant system, or the indication of the number of shards that are to store replicated configuration data for each tenant of the multi-tenant system; and
obtaining a second output of the sharding function, wherein the second output indicates a second set of shards of the multi-tenant system that are to store the second configuration data for the second tenant, the second set of shards comprising the second shard.

5. The method of claim 1, further comprising:
providing one or more of the first configuration data or the second configuration data as input to the machine learning model, wherein the machine learning model is trained to predict, based on given input configuration data, a set of shards of the multi-tenant system that is to store the given input configuration data in view of at least one of a behavior or a performance of nodes of the multi-tenant system;
obtaining one or more outputs of the machine learning model; and
extracting, from the one or more obtained outputs, at least one of a first set of shards that is to store the first configuration data or a second set of shards that is to store the second configuration data, wherein the at least one of the first set of shards or the second set of shards comprises the first shard residing at the first node.

6. The method of claim 1, wherein the second request to access the second configuration data is received prior to detecting the anomaly associated with the update to the first configuration data at the first node.

7. The method of claim 1, further comprising:
receiving a third request to erase the first configuration data from a memory associated with the first shard residing at the first node;
updating a first flag associated with the first configuration data to indicate that the first configuration data is to be erased from the memory; and
responsive to detecting an update to a second flag associated with the second configuration data to indicate that the second configuration data is to be erased from the memory, erasing the first configuration data and the second configuration data from the memory.

8. A system comprising:
a memory device; and
a processing device coupled to the memory device to perform operations comprising:
storing, based on an output of at least one of a sharding function or a machine learning model, configuration data of a first shard at a first node of a multi-tenant system, wherein the configuration data of the first shard comprises first configuration data associated with a first tenant of the multi-tenant system and second configuration data associated with a second tenant of the multi-tenant system;
receiving a first request to update the first configuration data;
upon initiating an operation to update the first configuration data at the first node in accordance with the first request, detecting an anomaly associated with the update to the first configuration data at the first node;
receiving a second request to access the second configuration data associated with the second tenant of the multi-tenant system;
identifying a second node of the multi-tenant system that comprises a second shard that includes the second configuration data associated with the second tenant; and
performing an operation to provide the second tenant with access to the second configuration data at the second node before the detected anomaly associated with the update to the first configuration data at the first node is resolved.

9. The system of claim 8, wherein the operations further comprise:
obtaining the first configuration data associated with the first tenant and the second configuration data associated with the second tenant;
updating a configuration file to include at least a portion of the first configuration data and at least a portion of the second configuration data; and providing the configuration file to be stored at a region of memory associated with the first shard at the first node.

10. The system of claim 9, wherein the operations further comprise:
providing, as input to the sharding function, one or more of: a first identifier associated with the first tenant, an indication of a number of shards of the multi-tenant system, or an indication of a number of shards that are to store replicated configuration data for each tenant of the multi-tenant system;
obtaining a first output of the sharding function, wherein the first output indicates a first set of shards of the multi-tenant system that are to store the first configuration data for the first tenant, the first set of shards comprising the first shard;
providing, as input to the sharding function, one or more of: a second identifier associated with the second tenant, the indication of the number of shards of the multi-tenant system, or the indication of the number of shards that are to store replicated configuration data for each tenant of the multi-tenant system; and
obtaining a second output of the sharding function, wherein the second output indicates a second set of shards of the multi-tenant system that are to store the second configuration data for the second tenant, the second set of shards comprising the second shard.

11. The system of claim 9, wherein the operations further comprise:
providing one or more of the first configuration data or the second configuration data as input to the machine learning model, wherein the machine learning model is trained to predict, based on given input configuration data, a set of shards of the multi-tenant system that is to store the given input configuration data in view of at least one of a behavior or a performance of nodes of the multi-tenant system;
obtaining one or more outputs of the machine learning model; and
extracting, from the one or more obtained outputs, at least one of a first set of shards that is to store the first configuration data or a second set of shards that is to store the second configuration data, wherein the at least one of the first set of shards or the second set of shards comprises the first shard residing at the first node.

12. The system of claim 9, wherein the anomaly associated with the update to the first configuration data at the first node is detected responsive to executing the configuration file stored at the memory associated with the first node.

13. The system of claim 8, wherein the second request to access the second configuration data is received prior to detecting the anomaly associated with the update to the first configuration data at the first node.

14. A non-transitory computer readable storage medium comprising instructions for a server that, when executed by a processing device, cause the processing device to perform operations comprising:
storing, based on an output of at least one of a sharding function or a machine learning model, configuration data of a first shard at a first node of a multi-tenant system, wherein the configuration data of the first shard comprises first configuration data associated with a first tenant of the multi-tenant system and second configuration data associated with a second tenant of the multi-tenant system;
receiving a first request to update the first configuration data;

upon initiating an operation to update the first configuration data at the first node in accordance with the first request, detecting an anomaly associated with the update to the first configuration data at the first node;
receiving a second request to access the second configuration data associated with the second tenant of the multi-tenant system;
identifying a second node of the multi-tenant system that comprises a second shard that includes the second configuration data associated with the second tenant; and
performing an operation to provide the second tenant with access to the second configuration data at the second node before the detected anomaly associated with the update to the first configuration data at the first node is resolved.

15. The non-transitory computer readable storage medium of claim 14, wherein the operations further comprise:
obtaining the first configuration data associated with the first tenant and the second configuration data associated with the second tenant;
updating a configuration file to include at least a portion of the first configuration data and at least a portion of the second configuration data; and
providing the configuration file to be stored at a region of memory associated with the first shard at the first node.

16. The non-transitory computer readable storage medium of claim 15, wherein the operations further comprise:
providing, as input to the sharding function, one or more of: a first identifier associated with the first tenant, an indication of a number of shards of the multi-tenant system, or an indication of a number of shards that are to store replicated configuration data for each tenant of the multi-tenant system;
obtaining a first output of the sharding function, wherein the first output indicates a first set of shards of the multi-tenant system that are to store the first configuration data for the first tenant, the first set of shards comprising the first shard;
providing, as input to the sharding function, one or more of: a second identifier associated with the second tenant, the indication of the number of shards of the multi-tenant system, or the indication of the number of shards that are to store replicated configuration data for each tenant of the multi-tenant system; and
obtaining a second output of the sharding function, wherein the second output indicates a second set of shards of the multi-tenant system that are to store the second configuration data for the second tenant, the second set of shards comprising the second shard.

17. The non-transitory computer readable storage medium of claim 15, wherein the operations further comprise:
providing one or more of the first configuration data or the second configuration data as input to the machine learning model, wherein the machine learning model is trained to predict, based on given input configuration data, a set of shards of the multi-tenant system that is to store the given input configuration data in view of at least one of a behavior or a performance of nodes of the multi-tenant system;
obtaining one or more outputs of the machine learning model; and
extracting, from the one or more obtained outputs, at least one of a first set of shards that is to store the first configuration data or a second set of shards that is to store the second configuration data, wherein the at least one of the first set of shards or the second set of shards comprises the first shard residing at the first node.

18. The non-transitory computer readable storage medium of claim 15, wherein the anomaly associated with the update to the first configuration data at the first node is detected responsive to executing the configuration file stored at the memory associated with the first node.

19. The non-transitory computer readable storage medium of claim 14, wherein the second request to access the second configuration data is received prior to detecting the anomaly associated with the update to the first configuration data at the first node.

20. The non-transitory computer readable storage medium of claim 14, wherein the operations further comprise:
   receiving a third request to erase the first configuration data from a memory associated with the first shard residing at the first node;
   updating a first flag associated with the first configuration data to indicate that the first configuration data is to be erased from the memory; and
   responsive to detecting an update to a second flag associated with the second configuration data to indicate that the second configuration data is to be erased from the memory, erasing the first configuration data and the second configuration data from the memory.

* * * * *